United States Patent [19]
Clifford, Jr.

[11] Patent Number: 4,789,915
[45] Date of Patent: Dec. 6, 1988

[54] TAPE CARTRIDGE BRAKE

[75] Inventor: George M. Clifford, Jr., Los Altos Hills, Calif.

[73] Assignee: Hewlett-Packard Company, Palo Alto, Calif.

[21] Appl. No.: 866,819

[22] Filed: May 27, 1986

[51] Int. Cl.⁴ .................................................. G11B 23/02
[52] U.S. Cl. ..................................... 360/132; 242/198
[58] Field of Search .................. 360/132, 74.3, 74.1; 242/199, 198, 193, 194; 226/195

[56] References Cited
U.S. PATENT DOCUMENTS 2,838,250  6/1958  Stavrakis et al. ............... 226/195 X
3,137,427  6/1964  Martin ............................. 226/195 X
4,013,160  3/1977  Colecchi et al. ............... 242/194 X
4,290,567  9/1981  Saito ................................... 242/198
4,373,824  2/1983  Olsen ............................. 226/195 X Primary Examiner—Robert S. Tupper
Assistant Examiner—Andrew L. Sniezek
Attorney, Agent, or Firm—John A. Frazzini

[57]    ABSTRACT

A tape cartridge containing a pair of spools between which tape is fed and containing a brake that can stop rotation of the spools when no power is being applied to feed the tape. A passive mechanical embodiment is shown in which tension in the tape is used to release the brake.

7 Claims, 3 Drawing Sheets

4,789,915

TAPE CARTRIDGE BRAKE

BACKGROUND OF THE INVENTION

The disclosed invention relates in general to a tape cartridge, and relates more particularly to a brake for stopping the rotation of spools on which the tape is stored. In the following discussion, the first digit of a reference numeral indicates the first figure showing the element referenced by that reference numeral. In a typical data cartridge, there is sufficient inherent frictional resistance in the tape cartridge that a brake is not needed.

In the disc drive compatible tape cartridge illustrated in FIG. 1 and discussed in detail in U.S. patent application Ser. No. 713,162 entitled DISC DRIVE COMPATIBLE TAPE CARTRIDGE filed by Richard H. Henze, et al. on 3/18/85, a tape 10 is directed by a set of guide pins 11–16 in a folded path that passes the tape past a region (denoted by dotted line 17) in which data is recorded and read on the tape. A pair of spools 18 and 19 is used to store the tape. For the indicated direction of travel of the tape, spool 18 functions as the supply spool, and spool 19 functions as the takeup spool. A clutch 110 controls whether spool 18 or spool 19 functions as the takeup spool. A belt 111 transfers power from a hub 112 to clutch 110. When the tape cartridge is loaded into a disc drive, hub 112 is connected to the shaft of the disc drive motor so that the power to feed the tape is provided by the disc drive motor.

Because disc drive motors typically have only a relatively low amount of power, it is important the the disc drive compatible tape cartridge have only a minimal amount of inherent friction. As a result of the reduced friction, when the tape cartridge is removed from the disc drive, the tape can unwind from the spools during handling and accumulate spirally or randomly in the spool area. In addition, when the disc drive motor is stopped, the inertia of the tape and the spools will tend to make the tape unwind from the spools.

The tape that has wound off of the spools can become folded and creased on the spool, thereby damaging the tape and possibly jamming the cartridge. Also, when there is slack in the tape when the disc drive motor is powered on, the disc drive motor will initially be loaded only with the inertia of the tape that is being moved by the disc drive. At the point at which all of the slack has been removed, the power is suddenly applied to rotation of the supply spool, thereby producing shock loading of the tape that can damage the tape, the cartridge, and/or the disc drive. In one version of disc drive compatible tape cartridge, a brake is included in the disc drive to stop rotation of the spools when the tape cartridge is removed from the disc drive. In this embodiment, an arm is rotated against the side of a spool when the tape cartridge is removed from a disc drive. However, this embodiment does not prevent unwanted unwinding of the tape while the cartridge is still in the disc drive and does not slow down rotation of the spools when power to feed the tape is terminated.

SUMMARY OF THE INVENTION

In accordance with the disclosed preferred embodiment, a tape cartridge brake is presented that prevents unwanted rotation of the spools on which the tape is stored. The brake is configured to apply braking friction to the rotating spools when the disc drive motor is turned off. In addition, the brake prevents rotation of the spools when the tape is removed from the disc drive.

The brake can be any configuration, including disc-type brakes and shoe-type brakes, that is capable of controllably slowing down and stopping the rotation of the spools. In the preferred embodiment, a shoe-type brake is used because it is easily configured as a passive device that, in response to tension in the tape, is automatically released when the disc drive is powered on. This embodiment utilizes a pair of brake pads that are each pressed against an associated one of the spools when the brake is activated. The tape passes over a pin in the brake so that when the disc drive is powered on, the resulting tension in the tape makes the tape press against this pin and rotates the brake away from the spools. A spring is included to bring the brake into contact with the spools when the disc drive is turned off. This brake is specially adapted for use in the floppy tape cartridge shown in FIG. 1, but it and other types of brakes can be used in other types of tape recording units.

DESCRIPTION OF THE PREFERRED EMBODIMENT

Figure 1:
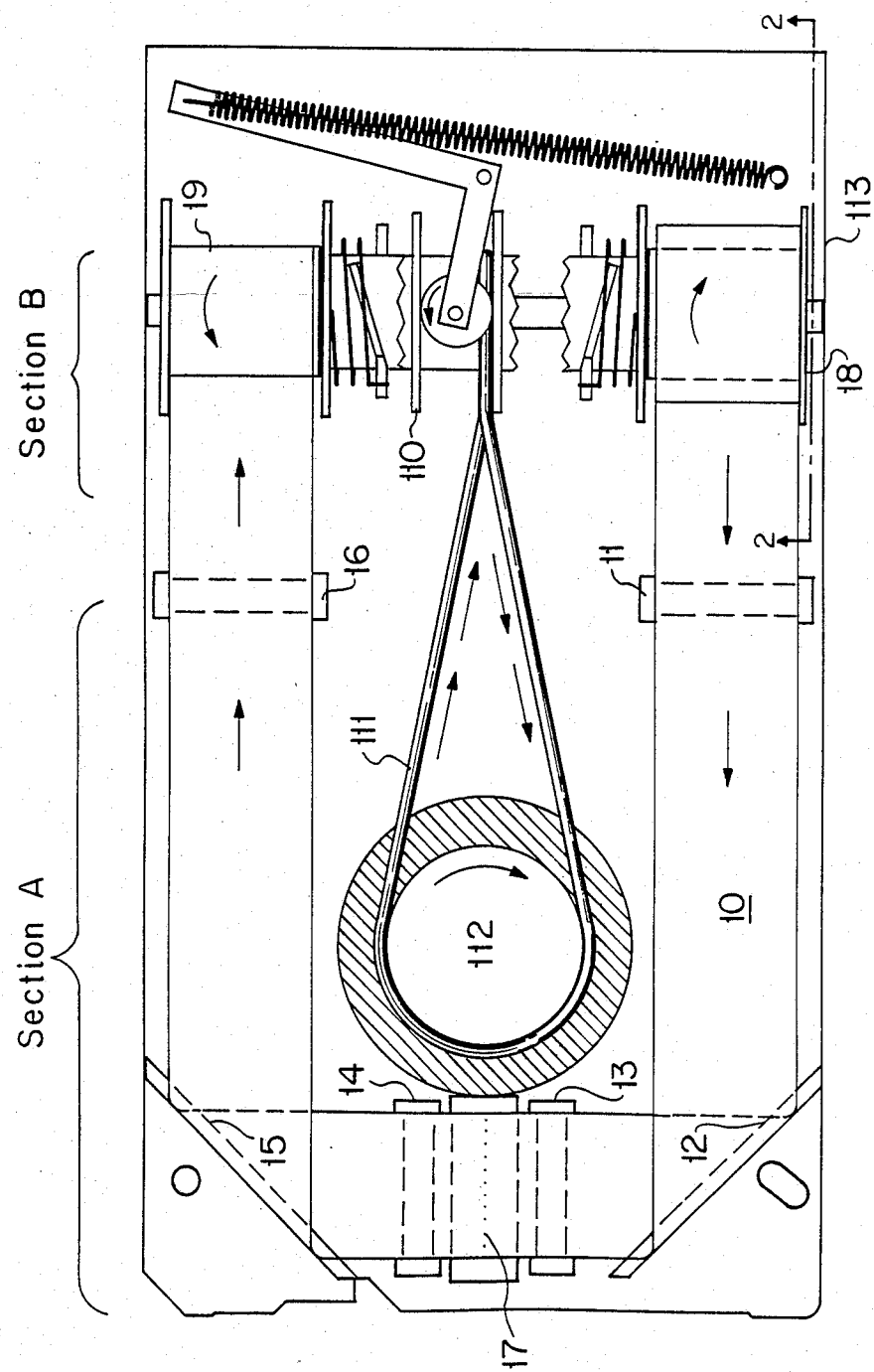
FIG. 1 shows a top view of a disc drive compatible tape cartridge in which the use of a brake is particularly advantageous.
Figure 2:
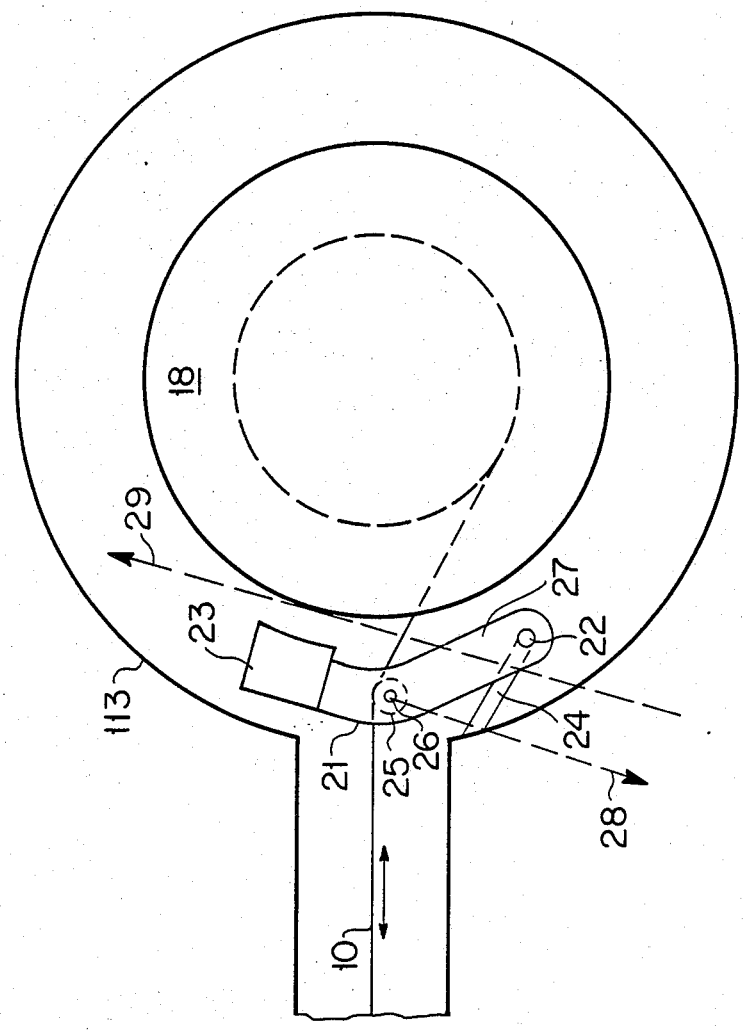
FIG. 2 shows a side view of a tape cartridge having a brake.

The disc drive compatible tape cartridge shown in FIG. 1 is enclosed by a protective shell 113 having a Section A and a Section B. Section A has a shape that enables it to be inserted into a conventional floppy disc drive through a slot in the front of the disc drive through which floppy discs are inserted Section B encloses the portion of the tape cartridge containing a pair of storage spools 18 and 19. In FIG. 2, a side view of Section B is shown for a tape cartridge containing a brake 21.

Figure 3:
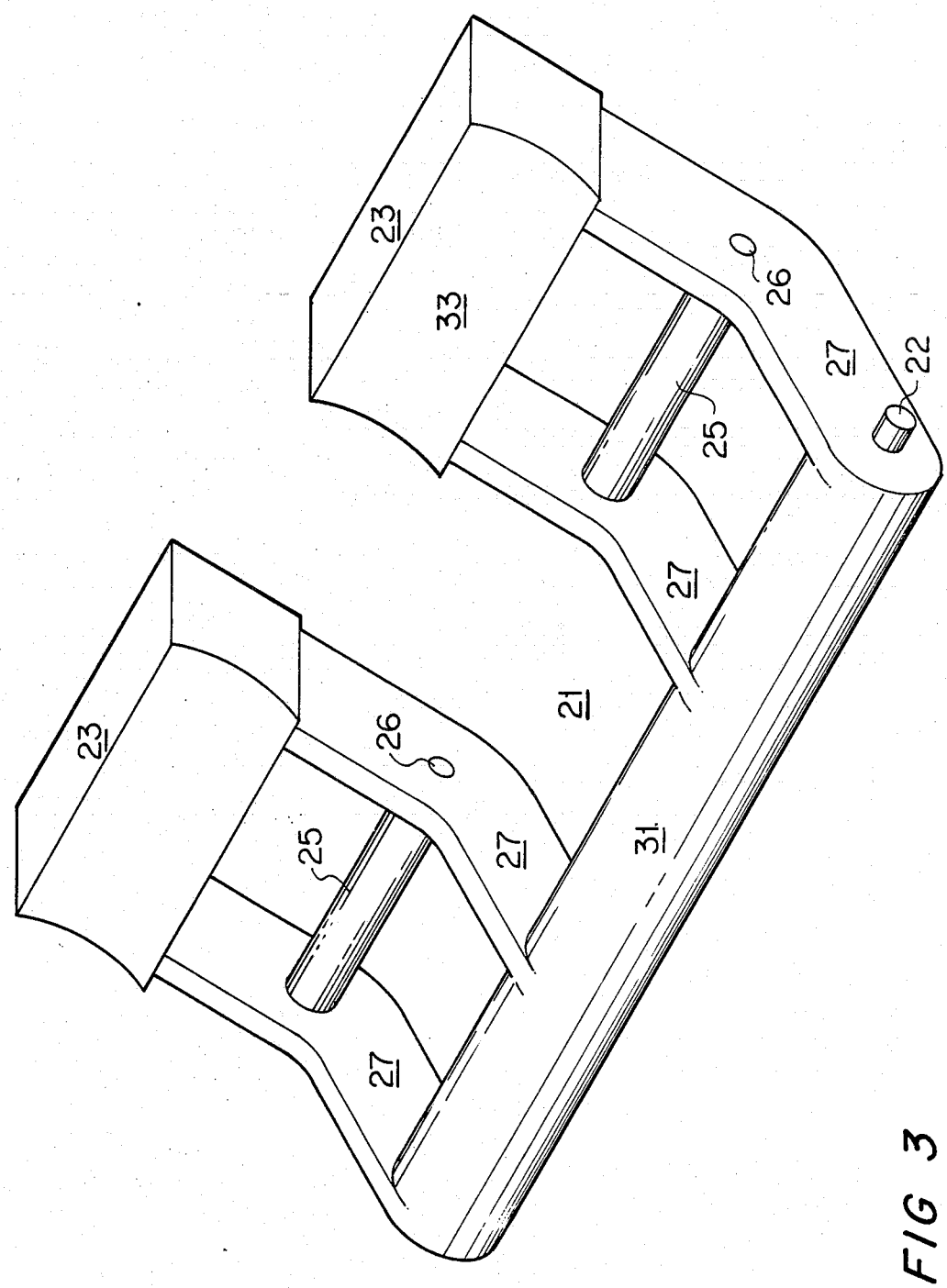
FIG. 3 shows a shoe-type brake suitable for use in the disc, drive compatible tape cartridge shown in FIG. 1.

Brake 21 is shown in greater detail in FIG. 3. Brake 21 contains a pair of brake pads 23, each of which is mounted on a pair of arms 27. Each pad has a front face 33 that is curved so hat it will fit against the circular rim of the spools. The brake is mounted in shell 113 so that each pad 23 can be pressed against an associated one of spools 18 and 19. In other embodiments, the brake can be configured to press the brake pad against the tape or against the side of the spool, such as in a disc-type brake. It is preferrable to press the brake pad against the spool instead of against the tape so that associated tape wear is avoided.

Figure 4:
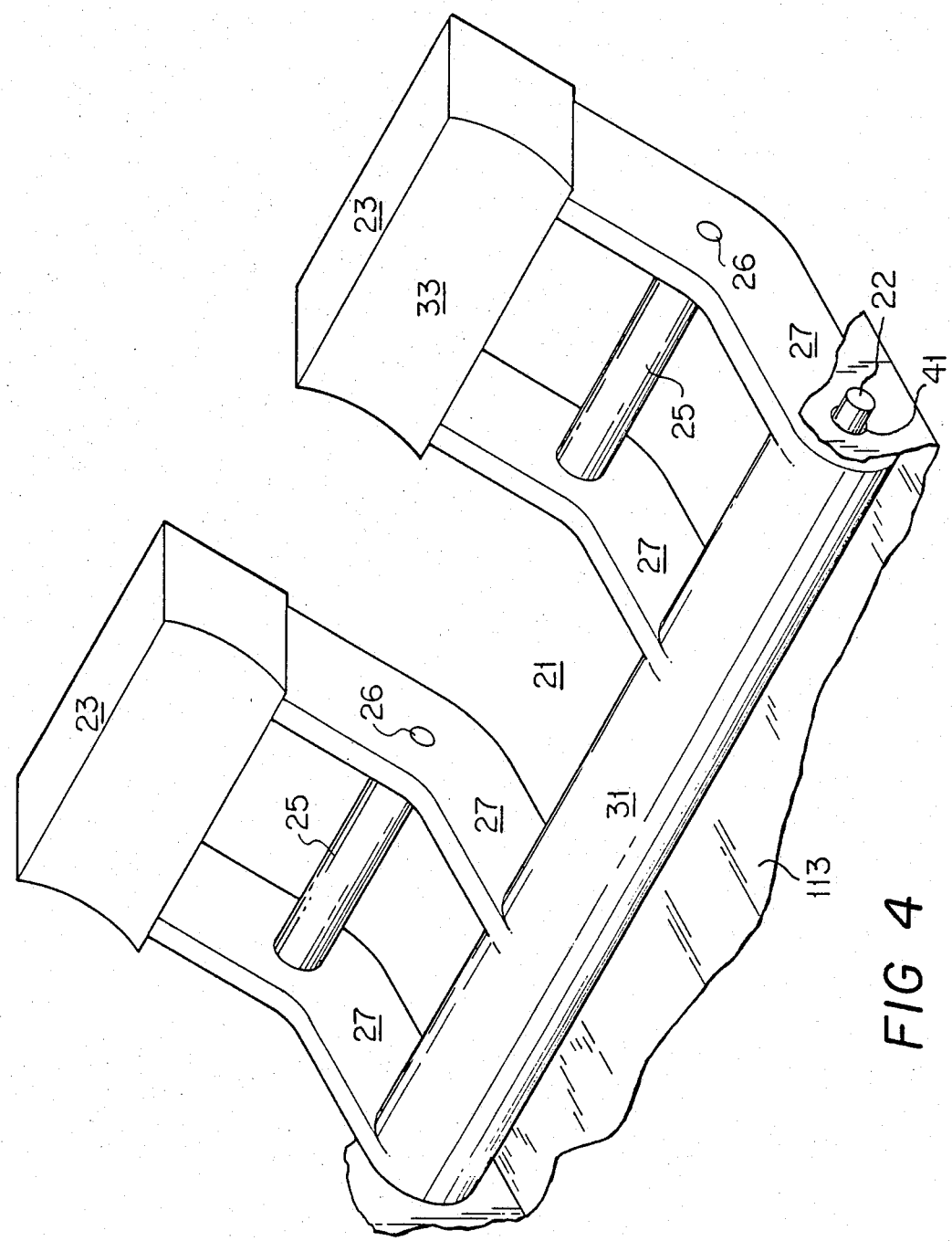
FIG. 4 shows the brake of FIG. 3 attached to the tape cartridge protective shell.

Between each pair of arms 27 is a pin 25. On each end of pin 25 is a pin that fits into a hole 26 in an arm 27 to secure pin 25 between the pair of arms 27. Both pairs of arms 27 are connected to a common shaft 31 so that both brake pads move together. On each end of shaft 31 is a hinge pin 22 that fits into an associated hole 41 (see FIG. 4) in shell 113 to rotatably attach the brake to the shell. A leaf spring 24 (shown in FIG. 2) presses against the shell to produce on arms 27 a torque about hinge pins 22 that rotates pads 23 toward spools 18 and 19.

Tape 10 passes over pin 25 to spool 18 so that tension in the tape produces a force on pin 25 in a direction 28. The location of hinge pin 22 is such that force 28 always produces a torque about hinge pin 22 that tends to rotate pad 23 away from spool 18, so that when there is tension in the tape, the tape will tend to pull brake pads 23 away from spools 18 and 19.

For clockwise rotation of spool 18, when pad 23 is in contact with spool 18, a frictional force 29, tangent to spool 18 at the center of contact between pad 23 and spool 18, is produced on pad 23. For clockwise rotation of spool 18, the location of hinge pin 22 is such that force 29 produces a clockwise torque about hinge pin 22 that presses pad 23 toward spool 18. For counterclockwise rotation of spool 18, the direction force 29 and the direction of torque about hinge pin 22 are reversed so that pad 23 is pushed away from spool 18. As a result of this, the amount of friction between pad 23 and spool 18 is greater for clockwise rotation than for counterclockwise rotation of spool 18. Equivalent forces and torques are produced between the brake and spool at spool 19.

The direction of rotation of spool 18 in which the frictional force is greater is called the "self-energizing" direction of rotation because, for that direction, the friction helps pull pad 23 into spool 18, thereby increasing the amount of friction. As a result of this arrangement, the torque produced by spring 24 need only be sufficient to lightly press pad 23 into contact with spool 18 when there is negligible tension in tape 10. With this choice of spring tension, the amount of tension required in tape 10 to pull pad 23 away from spool 18 is minimized.

In general, each spool requires an associated brake so that tape does not unwind unintentionally from either spool. To prevent such unintentional unwinding, for each spool the self-energizing direction of its brake should be such that it prevents that spool from unwinding when the brake is activated. When both spools unwind from the bottom (as in FIG. 1) or from the top, then the brakes for both of the spools can be on the same side of the spools. In such a cartridge, a brake as in FIG. 3 can be used.

When spool 19 functions as the takeup spool, the rotation of spool 19 produces tension in tape 10. However, at dotted line 17, the read/write head pinches the tape so that the tension in the tape at the takeup spool is significantly greater than it is at the supply spool (in this case, spool 18). This tension at the takeup spool presses on its associated pin 25, thereby releasing the brake at both spool 18 and spool 19. This embodiment has the advantage that both brakes quickly release in response to tension in the tape at the takeup spool so that the brakes are automatically activated both when the tape cartridge is removed from the disc drive or when there is no power applied to feed the tape. However, other embodiments are possible including: a pair of brakes like in FIG. 3 but without being linked by a common shaft 31; and brakes that are electrically activated either directly by a signal from the disc drive or indirectly such as by production of an electrical signal in response to tension in tape 10. Likewise, the brake pads need not be rotatably attached to the protective shell, but instead could be mounted in a slidable manner so that they can be slid into contact with either the tape or the spools.

I claim:

1. A tape cartridge comprising:
   a tape;
   a pair of storage spools between which the tape is fed;
   a brake for preventing rotation or both spools; and
   means for releasing the brake at a first of said spools when power is applied to a second of said spools to feed the tape from the first spool to the second spool and for releasing the brake at the second spool when power is applied to the first spool to feed the tape from the second spool to the first spool, whereby said brake keeps the tape taut for tape feed in both the direction from the first spool to the second spool and in the direction from the second spool to the first spool.

2. A tape cartridge as in claim 1 wherein the brake at the first spool is released in response to tension in the tape at the second spool and the brake at the second spool is released in response to tension in the tape at the first spool.

3. A tape cartridge as in claim 2 further comprising a protective shell enclosing the tape and wherein the brake comprises a pair of brake pads movably attached to the protective shell such that each pad can be moved into contact with an associated one of the spools.

4. A tape cartridge as in claim 3 wherein said means for releasing the brake comprises a first shaft connected to a first brake pad associated with the second spool, a second shaft connected to a second brake pad associated with the first spool, said tape passing, in the following order, from the first spool over the first shaft, over a read/write head, and over the second shaft to the second spool;
   such that when power is supplied to takeup tape on the first spool, the tape between the read/write head and the first spool is placed under tension causing the first pad to be moved away from contact with the second spool; and
   such that when power is applied to takeup tape on the second spool the tape between the read/write head and the second spool is placed under tension causing the second pad to be moved away from contact with the first spool.

5. A tape cartridge as in claim 4 wherein said brake pads are rotatably attached to the protective shell.

6. A tape cartridge as in claim 5 wherein said brake pads are connected so that they rotate together about a common axis.

7. A tape cartridge as in claim 5 wherein each brake pad rotates about an axis that is located such that a self-energizing direction of rotation of its associated spool is in the direction in which tape unwinds from that spool.

* * * * *

UNITED STATES PATENT AND TRADEMARK OFFICE
CERTIFICATE OF CORRECTION

PATENT NO. : 4,789,915

DATED : December 6, 1988

INVENTOR(S) : George M. Clifford, Jr.

It is certified that error appears in the above-identified patent and that said Letters Patent is hereby corrected as shown below:

Column 1, line 32, "the the" should read -- that the --.

Column 2, line 31, "disc, drive" should read -- disc drive --.

Column 2, line 42, "inserted" should read -- inserted. --.

Column 2, line 50, "hat" should read -- that --.

Signed and Sealed this

Thirtieth Day of January, 1990

*Attest:*

JEFFREY M. SAMUELS

*Attesting Officer*     Acting Commissioner of Patents and Trademarks